US008700992B1

(12) United States Patent
Sedov

(10) Patent No.: US 8,700,992 B1
(45) Date of Patent: Apr. 15, 2014

(54) METHOD FOR DETERMINING POSITION AND DIMENSIONS OF WEBPAGE ELEMENTS BY WIREFRAME INJECTION

(75) Inventor: Dan Sedov, Kirkland, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/287,587

(22) Filed: Nov. 2, 2011

(51) Int. Cl.
 *G06F 17/00* (2006.01)
(52) U.S. Cl.
 USPC .......................................... 715/238; 715/244
(58) Field of Classification Search
 USPC ..................... 715/234, 200, 243, 238, 244
 See application file for complete search history.

(56) References Cited

U.S. PATENT DOCUMENTS

| 7,895,293 | B1 * | 2/2011 | Vasilik | 709/218 |
| 7,917,846 | B2 * | 3/2011 | Decker et al. | 715/234 |
| 8,296,643 | B1 * | 10/2012 | Vasilik | 715/200 |
| 2005/0138550 | A1 * | 6/2005 | Dermler et al. | 715/517 |
| 2009/0100345 | A1 * | 4/2009 | Miller | 715/738 |
| 2012/0010995 | A1 * | 1/2012 | Skirpa et al. | 705/14.49 |

* cited by examiner

*Primary Examiner* — Manglesh M Patel
(74) *Attorney, Agent, or Firm* — Birch, Stewart, Kolasch & Birch, LLP

(57) ABSTRACT

A method of determining position and dimensions of webpage elements includes inserting test border code around certain elements of content in existing content code. The resulting content code including the test border code is rendered by a content-rendering application. A screen capture image of the rendered content is obtained, and the dimension and/or position of a rendered test border is obtained by analysis of the screen capture image. The dimension and/or position is compared respectively with a reference dimension or position to obtain a dimension difference and/or position difference. If the difference satisfies a predetermined condition, a test parameter corresponding to the element is adjusted based on the difference. In certain embodiments, the non-border elements are removed from the screen capture image.

14 Claims, 5 Drawing Sheets

```
<HTML>
<BODY>
    <A ID="interestingLink" HREF="http://www.sample.com">Hello World!</A>
</BODY>
</HTML>
```

FIG. 2A

```
<HTML>
<BODY>
    <SPAN STYLE="border: 1px solid #0000FF;">
    <A ID="interestingLink" HREF="http://www.sample.com">Hello World!</A>
    </SPAN>
</BODY>
</HTML>
```

FIG. 2B

METHOD FOR DETERMINING POSITION AND DIMENSIONS OF WEBPAGE ELEMENTS BY WIREFRAME INJECTION

FIELD OF THE INVENTION

The present disclosure generally relates to methods for testing displayed content of an electronic document that includes markup language, and particularly relates to adjusting a test method when content is displayed differently than expected by determining position and dimension of at least one element of a webpage by adding a wireframe to the element for analysis.

BACKGROUND

Electronic document content, including textual, graphic and/or interactive elements, generally does not by itself provide information related to how it should be presented for viewing. Several "markup languages" have been developed to provide such presentation information, and can direct a content-rendering application to present the content in a specified manner. In many cases the markup language includes "tags" that serve to mark a portion of content. The tags may directly provide information for formatting or may serve simply as a marker. In the latter case, a style sheet can be implemented to instruct a content-rendering application how to display the document based on the tags. The markup language is generally not displayed to an end-user viewer.

When developing or testing content for Internet or intranet consumption, a careful developer or tester typically should consider how different content-rendering applications may render the content. Even if particular care is employed to address known rendering differences, one or more elements of the content may be rendered with certain properties and dimensions in one web-browser, for example, while appearing to have different properties or dimensions in another web-browser. When a tester uses automatic testing software to test a web-page in different browsers, various elements of the displayed content may be tested for functionality. For example, a clickable button or a hyperlink may be clicked to ensure accuracy of functionality, or that the target of the hyperlink is valid. The test may fail, however, if the clickable button or hyperlink is displayed with one size and location in one web-browser while another web browser may display the button or hyperlink having a different size and/or location.

In just one example, for many years Microsoft Corporation's well-known Internet Explorer™ web browser has through several versions provided varying levels of support for common markup standards. Due to the historical ubiquity of the browser, and the variety in software versions still in use, prudent developers of web content and/or web applications must consider how such web content will appear when rendered by at least the most common browser versions. Add to this the different versions of several popular competing web-browser applications, each having its own variations in interpretation and compliance with support for markup standards, and it is easy to see how a conventional content testing environment could be complicated by the variations in content-rendering applications.

In conventional test environment using automated testing means (such as testing software), rendered content may be satisfactorily tested for functionality, appearance, and/or other characteristics—so long as the size and location of content elements are as the automated means expects. In situations where the display of one or more elements varies in size or location, the automation may fail or otherwise provide an undesirable test result. When automated testing fails, a user may be required to manually compare size/location of the content rendered in each content-rendering application or make time-consuming manual adjustments to the test configuration only for a particular instantiation. The user may employ various means for such comparison, including programmatic comparison of screen captures. In this case, however, a single pixel difference, or a slight variation in color/font/size of the content can be reported as a difference requiring further, time-consuming, and ultimately unwarranted manual scrutiny.

Although generally reliable, manual testing and/or comparison is slow and costly in comparison with automated testing/comparison. For at least this reason, reliable full automation would benefit any content testing process, and may be particularly helpful in environments where a large volume of content is reviewed or tested. Minimizing manual (human-performed) comparison or testing of rendered content would thus save at least time and money.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

According to one aspect of the disclosure, test border code is inserted into content code, e.g., of a webpage, for rendering a test border (or wireframe) around an element of content to be rendered by a content-rendering application, the element including a predetermined type of identifier. The content code including the test border code is then rendered by the content rendering application. A screen capture of the rendered content is obtained, and a dimension of the test border is determined. A difference between the determined dimension and a reference dimension is calculated. If the dimension difference satisfies a first predetermined condition, a first test parameter of a content testing configuration for the element of content is adjusted based on the dimension difference.

According to another aspect, a position of the test border may additionally be determined, and a difference between the determined position and a reference position calculated. If the position difference satisfies a second predetermined condition, a second test parameter of the content testing configuration for the element of content is adjusted based on the position difference.

The first predetermined condition may be a dimension difference threshold.

The second predetermined condition may be a position difference threshold.

According to another aspect, non-test border elements of the screen capture are removed prior to determining the dimension of the test border.

According to another aspect, the content code is HTML corresponding to a webpage.

According to another aspect, the content-rendering application is a web-browser.

According to another aspect, a color of the test border is dependent on the type of identifier such the test border for one type of element has a color different from the test border for a different type of element.

According to another aspect, the test configuration includes a target position for interacting with the content element, and, when the position difference does not satisfy the predetermined condition, the target position is adjusted based on the position difference.

According to an aspect of the disclosure, test border code is inserted into content code for rendering a test border around an element of content to be rendered by a content-rendering application, the element including a predetermined type of identifier. The content code including the test border code is then rendered by the content-rendering application. A screen capture of the rendered content is obtained, and a position of the test border is determined. A position difference between the determined position and a reference position is calculated, and, if the position difference satisfies a predetermined condition a test parameter corresponding to the element of content is adjusted based on the position difference.

According to an aspect of the disclosure, a website layout testing environment includes a plurality of machines configured to each respectively execute the method of claim 1, wherein the content rendering application is different for each of the plurality of machines. In one aspect, the plurality of machines may be virtual machines.

Aspects of the disclosure may be stored as instructions on a non-transitory, computer readable medium which when the instructions are executed by one or more processors perform the methods described above.

In an aspect of the disclosure an apparatus includes test border code insertion circuitry, a processor, a screen capturing unit, a test frame location unit, a calculating unit, and a test configuration adjustment unit. The test border code insertion circuitry is configured to insert test border code for rendering a test border around an element of content to be rendered by a content-rendering application, where the element includes a predetermined type of identifier. The processor renders the content including a test border based on the test border code for display on a display unit. The screen capturing unit obtains a screen capture of the rendered content including the test border. The test frame location unit determines a position and dimension of the test border. The calculating unit calculates at least one of a position difference between the determined position and a reference position, and a dimension difference between the determined dimension and a reference dimension. The test configuration adjustment unit adjusts a test configuration of the element of content based on at least one of the position difference and the dimension difference in response to the position difference or the dimension difference satisfying a predetermined condition.

Further scope of applicability of the present invention will become apparent from the Detailed Description given below. However, it should be understood that the Detailed Description and specific examples, while indicating preferred embodiments of the invention, are given by way of illustration only, since various changes and modifications within the spirit and scope of the invention will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

FIGS. 2*a*-2*b* illustrate an example of wireframe injection according to one aspect of the disclosure;

Figure 1A:
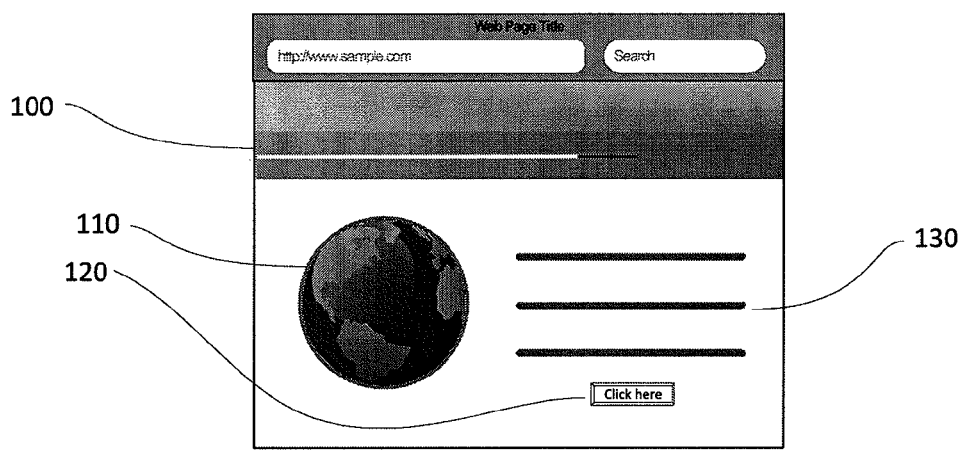
FIGS. 1*a*-1*c* illustrate an embodiment of aspects of the disclosure.

Headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The appearance of content elements displayed in a web browser may be analyzed for comparison against a reference appearance so that testing of the elements may be accomplished with minimal user input. Markup language code generally includes "tags" or other identifiers that are interpreted by a content rendering application to present corresponding content in a particular desired manner. The markup language code may include, but is not limited to, presentational markup, procedural markup, and/or descriptive markup and can affect size, color, position, and many other aspects of resulting rendered content. Such markup may be loosely or strictly realized according to one or more corresponding markup standards; for example: HTML, CSS, XML, XHTML, SGML, LaTeX, PostScript, PDF, etc. (It is noted that these standards themselves may have different versions.) Markup-coded content may be obtained from a local storage or remote server for display by a particular content-rendering application. In some instances, content may be coded dynamically or on demand. The present description will focus on HTML code for display by various web browsers. However, the inventor recognizes that the principles disclosed herein are applicable to testing of content marked up using other markup languages.

FIG. 1A illustrates a representative page of rendered content 100 having several elements such as a graphic element 110, an input element 120, and a paragraph or container element 130. One of skill in the art will appreciate that these are but three of the many types of elements that may be included in an electronic document, and that the present disclosure is not limited to those specifically disclosed. These elements may appear somewhat differently in one content-rendering application vs. another content rendering application. Markup language (such as HTML) underlying the rendered content includes tags and/or identifiers that correspond to various elements of the displayed webpage.

Figure 1B:
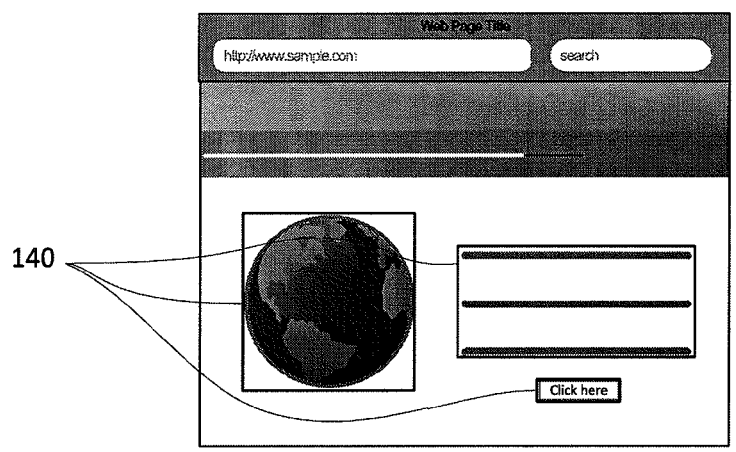

FIG. 1B illustrates the same rendered content 100, with the addition of wireframes (borders) 140 that surround several of the page elements. It will be appreciated that a wireframe may be inserted around virtually any element of an electronic document. In one aspect, the wireframe is inserted around at least one element that includes markup language. The wireframe may in some aspects be inserted around different electronic document elements that are displayed but not differentiated to the viewer. For example, markup language may designate identical background elements that are rendered to display only an area of color, which when displayed are indistinguishable from each other.

It will be acknowledged by one having of ordinary skill in the art that a particular test environment may be concerned with all elements, or only with particular markup elements, and wireframes may be added accordingly. By way of example, and not intended to limit the types of elements considered, the test environment may be configured to insert wireframes around all interactive elements (such as hyperlinks or clickable buttons), or only certain hyperlinks. It will be appreciated that test environment software utilizing the disclosed wireframe injection may be configured for automatic or manual selection of elements for wireframe injection. The details of such configuration and selection are not a topic of this disclosure. Wireframes for different types of elements may, in one aspect, be differentiated; for instance, by color. For example, all graphic elements may be designated using a red wireframe. Typically, the color of the wireframe(s) is different from any other color displayed in the electronic document. The color difference can be ensured by manual configuration, or by way of an automatic survey survey of default colors and/or colors identified in the electronic document or associated style sheet(s).

Figure 1C:
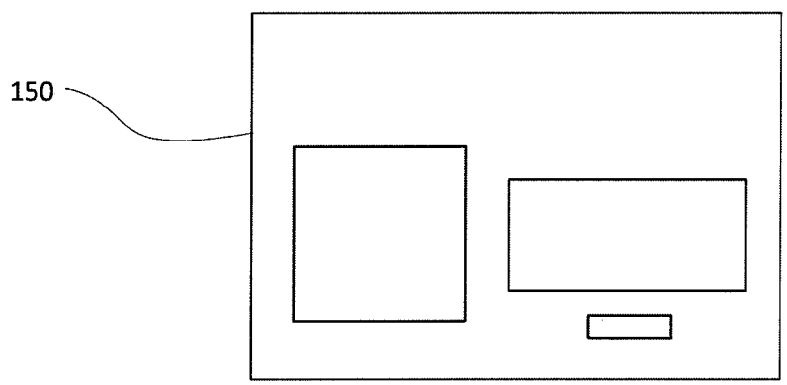

In FIG. 1C, non-wireframe elements of the rendered content 100 are removed, leaving only the wireframes 140. In one aspect of the disclosure, removal of non-wireframe elements may include capturing a screen-shot image of the rendered content including the wireframes, and processing the screen-shot image to remove or normalize all pixels not matching the color(s) of respective wireframe(s). The position and/or dimension of the borders can thus be determined and compared with a reference or expected position and/or dimension.

More particularly, FIG. 2A illustrates example hyper-text markup language (HTML) code 200 for a webpage that includes a simple hyperlink (which, when displayed in a web-browser will allow a user or specialized test program to click a link that appears as "Hello World!" to direct the web browser to a website having the URL "http://www.sample.com"). The HTML code 200 in this example includes both an anchor tag (<a . . . > . . . </a>) 210 and an identifier ("interestingLink") 220 that identifies the anchor tag more distinctly. Different tags, including other anchor tags, may each have unique identifiers.

According to an embodiment of the present disclosure, code for drawing a wireframe is inserted into the original HTML code 200 such that a wireframe is rendered around the anchor element. FIG. 2B illustrates the modified HTML code 250 which includes all the elements of the original HTML code 200 plus wireframe HTML code 260. In the illustrated embodiment, a SPAN tag is inserted around the anchor tag and is configured to specify a 1-pixel wide solid border having a blue (#0000FF) color. It is of course acknowledged that any color and width may be selected for the border. Moreover, the border need not surround an existing tag, and my instead be inserted around text. (E.g., <SPAN style="border: 2px solid green">Hello World!</SPAN>) In some embodiments the color for the border may be calculated based on a hash of an identifier or tag type.

It will be appreciated by those having skill in the art that the present disclosure for insertion of wireframe code is not limited to anchor tags, and may be applied to many types of elements included in HTML or other markup code. For example, in addition to text, HTML elements such as text or DIV, INPUT, FORM, BUTTON, IMG, TABLE, and P (paragraph) may be targets for insertion of a wireframe. It is further acknowledged that HTML code other than a SPAN tag may be used to specify a wireframe/border. In one aspect, if the original HTML code includes a TABLE, the TABLE itself could in one variation be amended to include a visible border, or content within a cell of the table could itself be the target of a border. Similar elements in other markup languages are acknowledged by the inventor as being likely targets for wireframe insertion. Similarly an element having an existing border could be revised such that the border can be differentiated from the original content by specifying a different color, thickness, etc. It must be further appreciated by those having skill in the art that HTML includes a variety of tags, and that identifiers may be arbitrarily chosen by the content developer. Further still, it must be appreciated that in certain embodiments wireframe/border code may be inserted into, and using, other forms of markup language, which may use tags or identifiers differently from or additional to those used by HTML.

Figure 3:
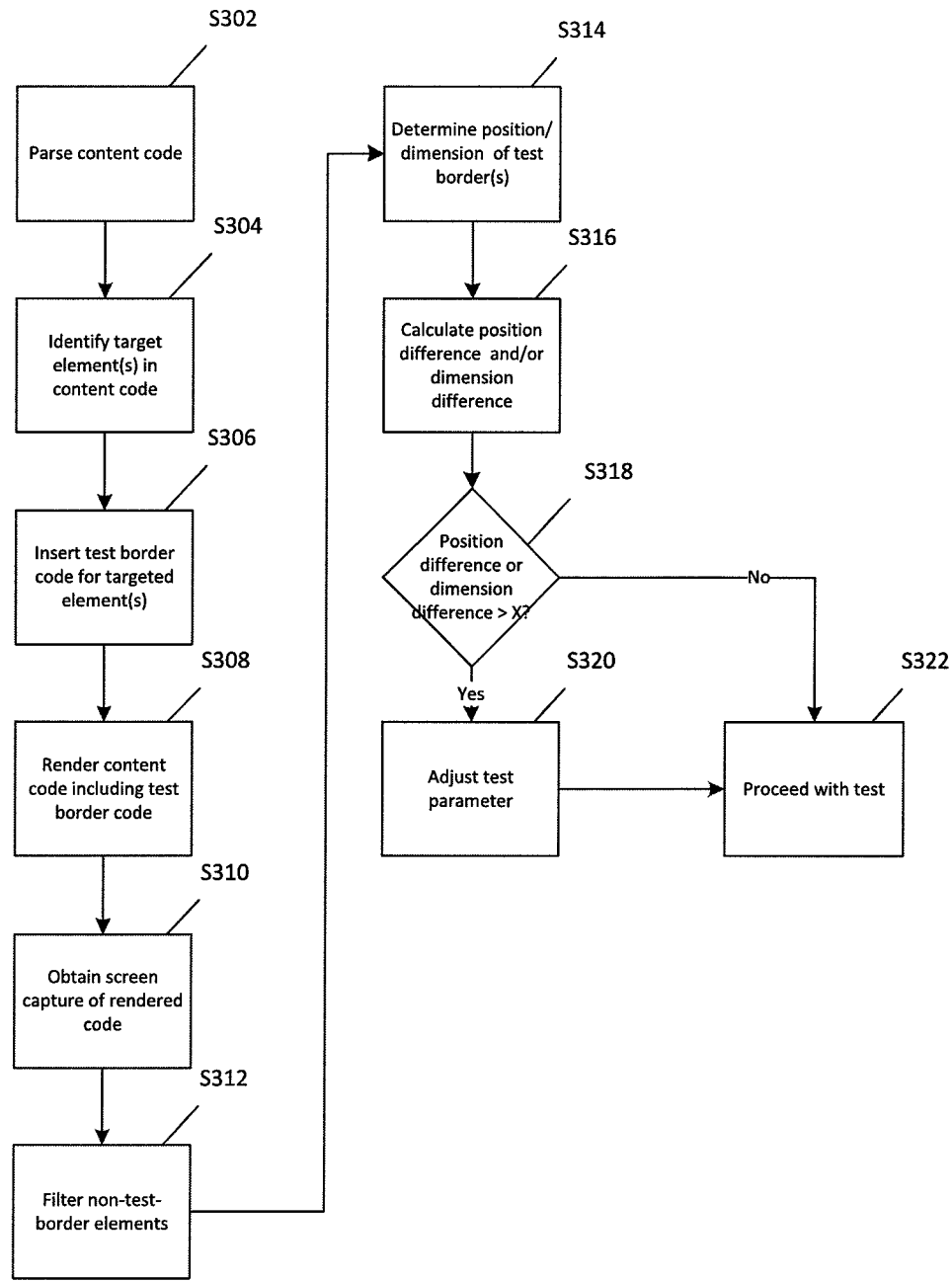
FIG. 3 is a flow chart illustrating steps according to one aspect of the disclosure.

FIG. 3 presents a flow chart for an embodiment of the disclosure. Content code is obtained and parsed (S302) for the purpose of identifying target element(s) in the content code (S304). Predetermined wireframe code is inserted (S306) into the content code to surround the target element(s). The modified code is then rendered for display (S308). A screen capture image is obtained of the rendered content code including the inserted wireframe (S310). The screen capture image is processed to filter or other wise remove all elements (e.g., text, graphics, backgrounds, etc.) of the screen capture image other than the inserted wireframe(s) (S312). With only the wireframes remaining in the filtered image (see FIG. 1C), the page position of each border and at least one of its dimensions is determined (S314).

In one embodiment the determined position and dimensions are compared with a reference position/dimension to obtain a position difference and/or dimension difference (S316). The position difference may be referred to as a relative position (relative to the reference position). Likewise, the dimension difference may be referred to as a relative dimension. Each difference may be positive or negative with relation to the reference. If the difference is greater than a predetermined threshold difference (S318-Yes), a test parameter of an automated test environment is adjusted (S320). Alternatively, the HTML code for the web-page may edited to compensate for the rendering difference (not shown). For example, the reference position of an automated hyperlink click may be adjusted to successfully click a link when the position and/or dimension of the corresponding hyperlink is rendered in a position too far away from the expected reference position to successfully click. If neither difference is greater than a predetermined threshold (S318-No), the reference position and/or dimension is retained for the test. In one embodiment, the threshold difference is zero.

In an alternative embodiment, the absolute position and/or dimension of the wireframe element may be used directly, and the test automation will be updated in every instance.

Figure 4A:
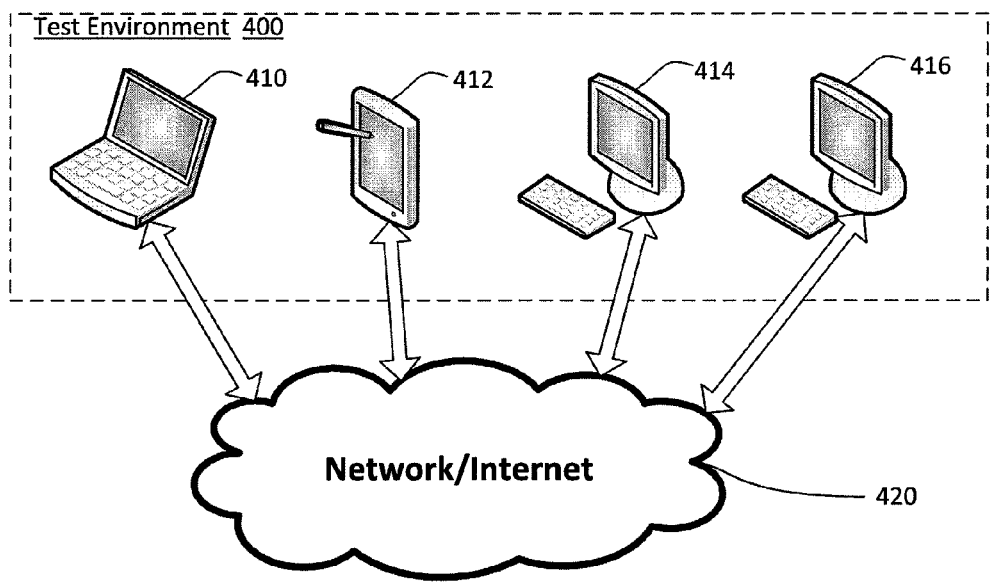
FIGS. 4*a*-4*b* illustrate two alternative embodiments of a test environment according to aspects of the disclosure.
Figure 4B:
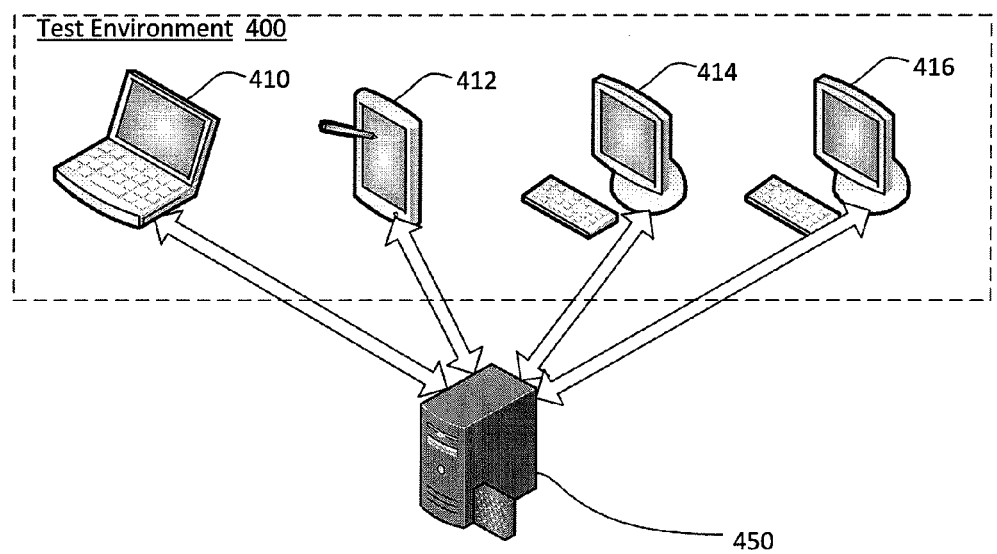

FIGS. 4A-4B illustrate alternative embodiments of a test environment 400 wherein a plurality of real or virtual machines 410, 412, 414, 416 are each configured to use a different content-rendering application, and/or different versions of the same content rendering application in order to test at least the most common varieties of content rendering applications. The figures illustrate four computing devices, but it will be appreciated that the test environment is scalable to include fewer or more real or virtual computing devices. The devices may include standard desktop computers, portable devices, smart phones, servers, and/or tablet computers, etc., and respective devices or virtual machines may be configured to each execute the described procedures using a different content-rendering application in order to collectively test across a range of environments (e.g., different software and/or software versions on different operating systems).

The computing devices may include a variety of operating systems, including, but not limited to various versions of Microsoft Windows, Apple iOS, Linux, UNIX, etc. Testing of content using the computing devices may be controlled or managed from a central server, or each computing device 410, 412, 414, 416 may perform testing independently in the test environment. As illustrated in FIG. 4A, computing devices 410-416 in the test environment 400 may each be connected to a network (such as the Internet) directly. It will be appreciated by those of skill in the art that such "direct" connection may include one or more intermediate routers, gateways, firewalls, etc. (not shown). Each computing device may receive, for testing, webpage content according to a predetermined test plan. Each computing device then performs the method of determining the position and/or dimension of particular target elements in the content code and inserting the wireframe(s).

Alternatively, as shown in FIG. 4B, each computing device 410-416 in the test environment 400 may be connected to a proxy server which beforehand obtains and modifies the web-content to include test borders for targeted elements.

Figure 5:
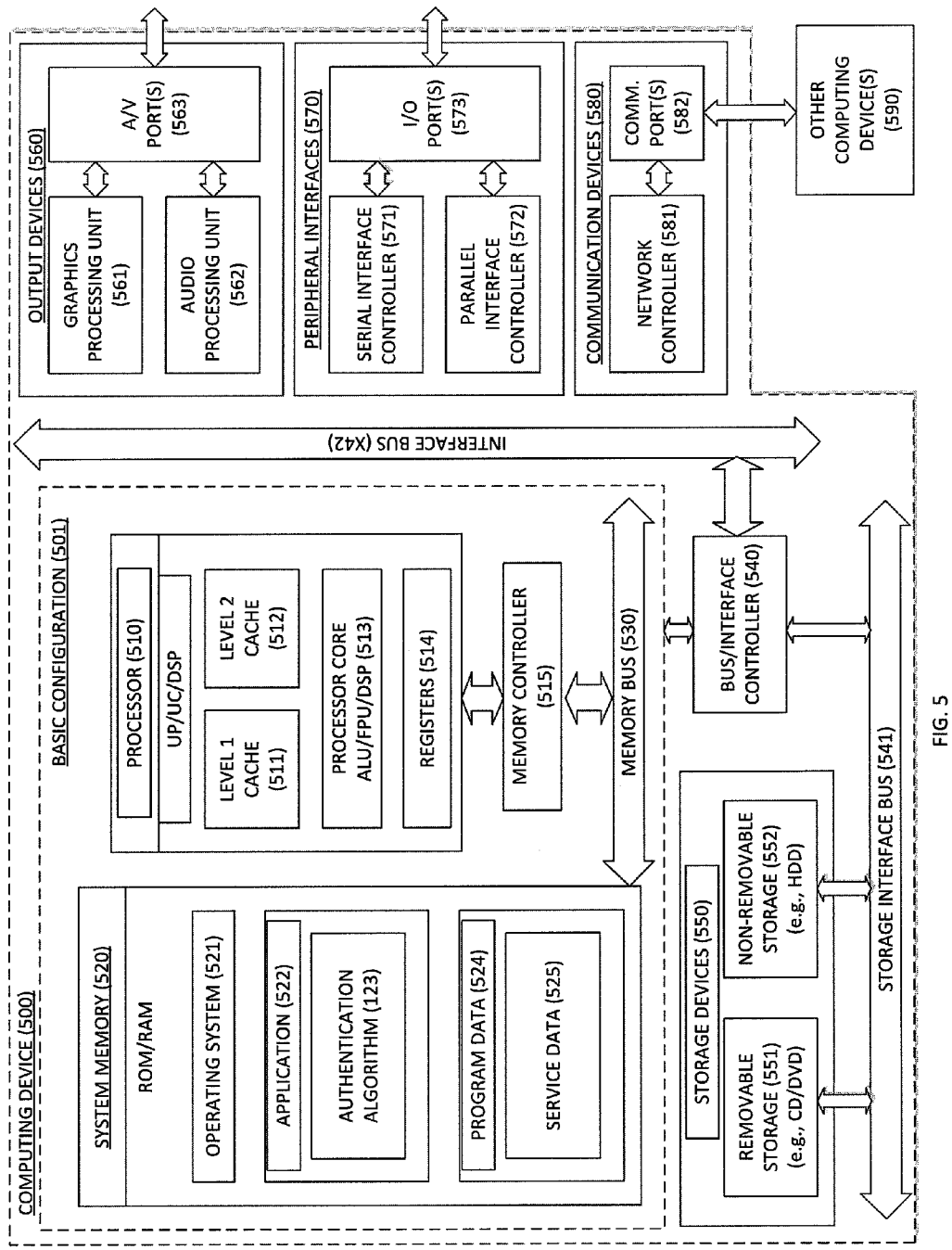
FIG. 5 is a block diagram illustrating components of a computing device that implements aspects of the disclosure.

FIG. 5 illustrates a block diagram of a computing device 500, which in a basic configuration 501 comprises one or more processors 510 and system memory 520. A memory bus 530 may be used for communicating between the processor 510 and the system memory 520. The computing device 500 may further comprise storage devices 550, output devices 560, peripheral interfaces 570, communication devices 580, along with various interface busses for data communication between the various elements. The computing device 500 may be realized in a variety of formats including, but not limited to: a desktop personal computer, a portable or mobile computing device such as a smartphone, Personal Digital Assistant (PDA), or other mobile device having the above features. The processor 510 receives and executes instructions from ROM/RAM 530, 540 for a computing application 535.

Depending on the desired configuration, processor 510 can be of any type including but not limited to a microprocessor (μP), a microcontroller (uC), a digital signal processor (DSP), or any combination thereof. Processor 510 may include one or more levels of caching, such as a level one cache 511 and a level two cache 512, a processor core 513, and registers 514. The processor core 513 may include an arithmetic logic unit (ALU), a floating point unit (FPU), a digital signal processing core (DSP Core), or any combination thereof. A memory controller 515 can also be used with the processor 510, or in some embodiments the memory controller 515 can be an internal part of the processor 510.

Depending on the desired configuration, the system memory 520 can be of any type including but not limited to volatile memory (e.g., RAM), non-volatile memory (e.g., ROM, flash memory, etc.) or any combination thereof. System memory 520 typically includes an operating system 521, one or more applications 522, and program data 524. In at least some embodiments, application 522 may constitute an automated test application configured to access a URL and test the webpage addressed thereby. The automated test application may include instructions for the above-described wireframe injection, or such instructions may be included in a separate application.

Program data 524 may include parameters 525 for the automated test application. For example, the parameters 525 may include the reference position and/or dimension of particular elements in a webpage. In some embodiments, application 522 can be arranged to operate with program data 524 on an operating system 521 such that a predetermined webpage is obtained, displayed, and tested.

A bus/interface controller 540 can be used to facilitate communications between the basic configuration 501 and one or more data storage devices 550 via a storage interface bus 541. The data storage devices 550 can be removable storage devices 551, non-removable storage devices 552, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of computing device 500.

Computing device 500 can also include an interface bus 542 for facilitating communication from various interface devices (e.g., output interfaces, peripheral interfaces, communication interfaces, etc.) to the basic configuration 501 via the bus/interface controller 540. Example output devices 560 include a graphics processing unit 561 and an audio processing unit 562 (e.g., audio quality unit 225 shown in FIG. 2 or audio quality unit 325 shown in FIG. 3), either or both of which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication (not shown) via one or more communication ports 582. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
    prior to rendering, inserting, into content code, test border code for rendering a test border around an element of content to be rendered by a content-rendering application, the element including a predetermined type of identifier;
    rendering the content code including the test border code;
    obtaining a screen capture of the rendered content;
    filtering the screen capture to remove all elements of the screen capture except the test border;
    determining a rendered dimension of the element of content using the test border;
    calculating a dimension difference between the rendered dimension and an expected dimension of the element of content; and
    responsive to the dimension difference satisfying a first predetermined condition, adjusting a first test parameter of a content testing configuration for the element of content based on the dimension difference.

2. The method of claim 1 further comprising:
    determining a position of the test border;
    calculating a position difference between the determined position and a reference position; and
    responsive to the position difference satisfying a second predetermined condition, adjusting a second test parameter of the content testing configuration for the element of content based on the position difference.

3. The method of claim 1 wherein the first predetermined condition is a dimension difference threshold.

4. The method of claim 2 wherein the second predetermined condition is a position difference threshold.

5. The method of claim 1, further comprising:
removing non-test border elements of the screen capture prior to determining the dimension of the test border.

6. The method of claim 1, wherein the content code is HTML corresponding to a webpage.

7. The method of claim 6, wherein the content-rendering application is a web-browser.

8. The method of claim 1, wherein a color of the test border is dependent on the type of identifier such the test border for one type of element has a color different from the test border for a different type of element.

9. The method of claim 2, wherein the test configuration includes a target position for interacting with the content element, and, when the position difference does not satisfy the predetermined condition, the target position is adjusted based on the position difference.

10. A method comprising:
prior to rendering, inserting, into content code, test border code for rendering a test border around an element of content to be rendered by a content-rendering application, the element including a predetermined type of identifier;
rendering the content code including the test border code;
obtaining a screen capture of the rendered content;
filtering the screen capture to remove all elements of the screen capture except the test border;
determining a rendered position of the element of content using the test border;
calculating a position difference between the rendered position and an expected position of the element of content; and
responsive to the position difference satisfying a predetermined condition, adjusting a test parameter for the element of content based on the position difference.

11. A website layout testing environment comprising:
a plurality of machines configured to each respectively execute the method of claim 1, wherein the content rendering application is different for each of the plurality of machines.

12. The website layout testing environment according to claim 11, wherein the plurality of machines are virtual machines.

13. A non-transitory, computer readable medium having instructions stored thereon, which when the instructions are executed by one or more processors perform the steps according to the method of claim 1.

14. An apparatus comprising:
circuitry configured to, prior to rendering, insert test border code for rendering a test border around an element of content to be rendered by a content-rendering application, the element including a predetermined type of identifier;
a processor that renders the content including the test border code for display on a display unit;
a screen capturing unit that obtains a screen capture of the rendered content including the test border;
a filtering unit that filters the screen capture to remove all elements of the screen capture except the test border;
a test frame location unit that determines a rendered position and dimension of the element of content using the test border;
a calculating unit that calculates at least one of:
a position difference between the rendered position and an expected position of the element of content, and
a dimension difference between the rendered dimension and an expected dimension of the element of content; and
a test configuration adjustment unit that, in response to the position difference or the dimension difference satisfying a predetermined condition, adjusts a test configuration of the element of content based on at least one of the position difference and the dimension difference.

* * * * *